Figure 1:
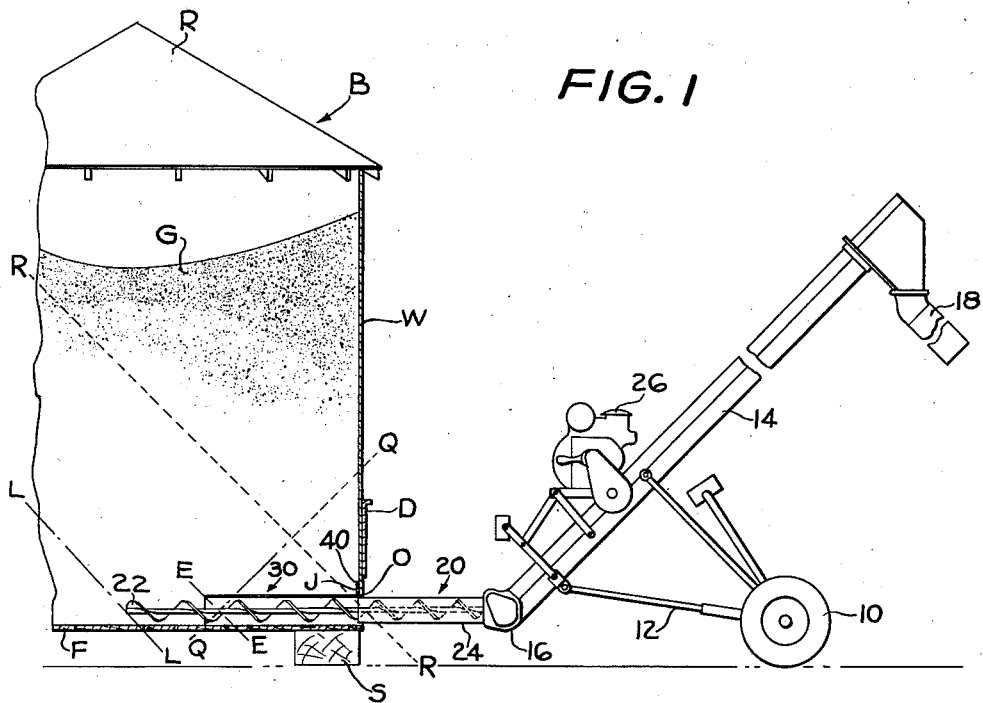

June 17, 1952   L. B. NEIGHBOUR   2,601,049
AUXILIARY DEVICE FOR UNLOADING GRAIN BINS
Filed Aug. 28, 1948

INVENTOR.
L.B. NEIGHBOUR
BY
ATTORNEYS

Patented June 17, 1952

2,601,049

UNITED STATES PATENT OFFICE 2,601,049

AUXILIARY DEVICE FOR UNLOADING GRAIN BINS

Leonard B. Neighbour, Moline, Ill., assignor to Deere & Company, Moline, Ill., a corporation of Illinois Application August 28, 1948, Serial No. 46,688

3 Claims. (Cl. 214—17)

This invention relates to the unloading of granular material, such as grain and the like, from storage bins or similar structures by means of elevator or conveying mechanism of the type including the so-called portable elevator which has a lower conveyor for unloading the material from the bin and an upwardly inclined conveyor for transferring unloaded material to a wagon, truck or other receptacle.

The portable elevator that is most widely used at the present comprises a wheeled truck on which is mounted an upwardly inclined tubular structure within which is provided a movable conveyor, ordinarily of the endless belt or chain type provided with flights or buckets for moving material upwardly to a discharge end which is at a level above the ground consistent with the height of the receptacle into which the material is to be discharged. The lower or receiving end of the elevator is provided with a first conveyor, ordinarily in the form of an auger or helical-flight device, which is positionable to take material from either a pile on the ground or from storage in a bin or similar structure.

In the case of the unloading of a bin, for example, the vertical wall of the bin is provided with an opening and the auger is inserted into the opening to receive material and consequently to move the material out of the pin and onto the upwardly moving conveyor. Bins as heretofore constructed were provided with an unloading opening normally closed by a door which could be removed or positioned to permit entry of the auger. However, as soon as this door was opened or removed, the grain would pour out upon the ground until the quantity collected upon the ground was sufficient to block the opening. It was, therefore, difficult to insert the auger into the bin; and, in addition, considerable manual labor was involved in the shoveling of the escaped grain or like material into the conveyor.

According to the present invention, there has been developed a structure which forms a tunnel within the bin. Specifically, the tunnel is in the form of an inverted U and extends into the bin from and in alignment with the discharge opening. The tunnel is placed directly above and secured to the floor and provides a tube into which the auger may be inserted. It is an object of the invention to make the tunnel structure of sufficient length as to form a seal against the escape of material from the bin. By this, it is meant that the inner end of the tunnel is sufficiently far within the bin to provide that the normal angle of repose of material in the bin does not intersect the floor of the bin at the discharge end of the tunnel. Therefore, when the discharge door is open, there will be no spilling of material out onto the ground and the tunnel will be substantially empty so as to permit easy insertion of the auger.

It is an important object of the invention to provide the tunnel of light-weight inexpensive construction so that it may be readily purchased and easily installed in a bin for use with elevators of various types. Primarily, it is intended that the tunnel structure be used with elevators of the type having unloading augers or helical-flight conveyors. A further object of the invention is to construct the tunnel element in such manner that it may be easily added to typical bin structure without requiring material alterations in said structure.

Figure 2:
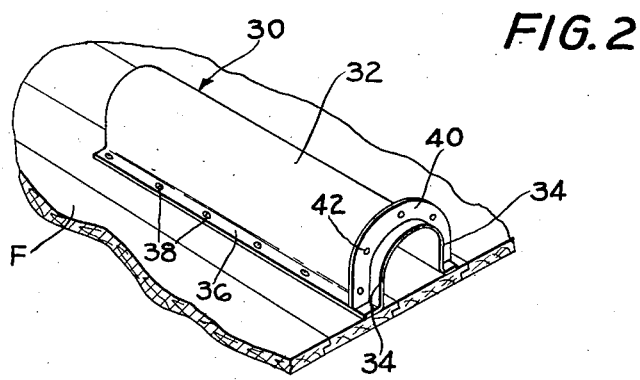

The foregoing and other important objects and desirable features inherent in and encompassed by the invention will become apparent to those versed in the art as a preferred form of the invention is fully disclosed in the following detailed description and accompanying sheet of drawings, in which Figure 1 is a comprehensive view showing an elevator in position for the unloading of a bin, the latter being shown in section to expose the structure thereof and the relationship thereto of the unloading tunnel; and Figure 2 is a fragmentary perspective view showing the structure of the tunnel and its relationship to the floor of the bin.

The type of elevator disclosed in Figure 1 is typical of several well known elevators and comprises a wheeled truck 10 on which is mounted adjustable supporting structure 12 for the carrying of an upwardly inclined tubular structure 14 which forms an elevator or conveyor having a lower or receiving end 16 and an upper or discharge end 18. The conveyor structure 14 may be of any conventional construction and the details thereof have therefore not been illustrated.

The lower or receiving end of the elevator or conveyor 14 is connected to a pick-up or unloading conveyor, designated generally by the numeral 20, preferably comprising an auger or helical-flight conveyor 22. The connection of the unloading auger to the receiving end 16 of the conveyor 14 includes a tube 24 which surrounds the elevator-proximate end of the auger 22 for confining material moved by the auger to a definite path into the receiving end 16. Both elevators or conveyors 14 and 22 may be driven by any suitable source of power, as by an internal combustion engine indicated at 26.

In Figure 1, a bin is indicated generally at B and may be considered typical of several types of bins or other storage receptacles commonly used on farms or elsewhere for the storage of grain or like granular material. In many cases, these bins or similar receptacles are temporary affairs, at least to the extent that they are of relatively light-weight, inexpensive construction and are not permanently fastened to the ground. In the present case, the bin is of the circular type having a wooden floor F, a vertical wall structure W and a roof R. The bin is supported on the ground with the floor F spaced a slight distance above the ground level. Since the bin is not permanently affixed to the ground, it may be supported on blocks or sills, a representation of which is shown at S in Figure 1.

A quantity of grain or similar material is indicated at G and is supported by the floor F and confined by the wall structure W. The wall structure is provided, as is customary in many cases, with a discharge opening or outlet O which is normally closed by a vertically slidable door D.

The unloading of the bin could be accomplished by the elevator 10—26 by means of opening the door D and inserting the auger 22 into the bin through the opening O. However, as soon as the door D is opened, the grain pours out of the opening O and will continue to escape until the grain outside the bin reaches such height as to block the opening or until the grain reaches its angle of repose, as indicated by the dotted line R—R.

According to the present invention, this undesirable result is eliminated by the provision of an auxiliary unloading device which is used in conjunction with the auger 22. As best shown in Figure 2, this device comprises a shield or tunnel 30 which in cross section is in the form of an inverted U having an arcuate top wall portion 32 and a pair of depending side walls 34. Each side wall is provided with means for securing the shield or tunnel 30 to the bin floor F, such means preferably comprising a longitudinally running flange 36 appropriately perforated to receive securing means, such as screws or nails 38 driven into the bin floor. The outer end of the shield may have a flange 40 apertured at 42 to receive securing means for attachment to the wall W bordering the opening O. The shield is preferably of sheet metal.

The shield or tunnel 30 is mounted in the bin in such manner that it extends inwardly over the bin floor from and in alignment with the outlet or discharge opening O. The outer end of the shield is arranged with respect to the opening O so that it provides a grain-tight joint, as at J in Figure 1, the flange 40 effecting the joint in the present case. The shield extends inwardly from the opening O to dispose its inner end at a point relatively remote from the opening; that is, the inner end of the shield is a substantial distance inwardly of the line R—R which represents the angle of repose of material which is allowed to escape through the opening O as in the prior art. The relationship between the shield 30 and the opening O as arranged according to the present invention is such that the shield forms a seal against the accidental escape of material through the opening O, since only a small quantity of grain can enter the shield or tunnel at its inner end, as along the line E—E in Figure 1. Hence, there will be no undesirable spilling of grain out the opening O as soon as the door D is opened.

The shield or tunnel structure 30 is of such size and shape as to cooperate with the upper surface of the bin floor F to provide a tube or tunnel for receiving the auger 22. The elevator is backed up to the bin B and the auger 22 is inserted through the uncovered opening O and through the tunnel or shield 30, the tube 24 about the elevator-proximate end of the auger 22 fitting within the opening O so that the parts 30 and 24 form, in effect, a continuous tubular structure along which the auger 22 will move grain to the receiving end 16 of the conveyor 14. The relative sizes of the parts 30 and 24 are such that the latter may be inserted a substantial distance into the former to provide for increased entry of the auger 22 into the grain G within the bin.

The auger 22 and conveyor 14 are operated to the extent desired to remove the necessary quantity of grain or to substantially completely empty the bin B. In the emptying of the bin, the quantity of grain remaining after the auger 22 ceases to be effective will depend upon the distance to which the auger 22 extends into the bin. For example, in the instance illustrated, the auger 22 will remove grain up to substantially the line L—L; and, because of the shield structure 30, an additional small quantity of grain will remain above the shield and at each side thereof, as represented generally by the line Q—Q. These relatively small quantities may be easily shoveled into the end of the auger 22.

Other objects and features of the invention not specifically enumerated above will readily occur to those versed in the art, as will various modifications and alterations in the preferred structure disclosed, all of which may be accomplished without departing from the spirit and scope of the invention as defined in the appended claims.

What is claimed is:

1. For use in the unloading of granular material such as grain or the like from a storage bin or similar structure by means of a portable elevator having an open auger conveyor wherein the bin has a horizontal floor on which material is supported and a vertical wall behind which the material is confined and in which is provided an opening that extends upwardly from the level of the floor and through which access is had to the material by insertion of the auger horizontally over the floor: a unit attachment shield of sheet metal or the like of elongated construction having its cross-sectional shape in the form of an inverted U to provide an arcuate top wall and a pair of spaced apart generally vertical side walls and an inner end and an outer end, said shield being positionable within the bin with the outer end adjoining and in alignment with the opening in said bin wall and extending inwardly over the floor so that the inner end is relatively remote from said opening and with the top wall of said shield spaced above the bin floor and the side walls extending to the floor to cooperate with the floor and provide a tunnel entirely above the level of the floor and communicating at the outer end of the shield through said bin wall opening to receive the elevator auger and opening at the inner end of the shield to material in the bin, the length of the shield from its inner end to its outer end being such that the angle of repose of material in the bin that has gravitational access to the inner end of the shield intersects the bin floor within the tunnel sufficiently remote from the bin wall opening so that material cannot flow by gravity outwardly through said opening, and each of said side walls having a horizontally flanged portion provided with perforations to receive securing means for attaching the shield to the bin floor.

2. For use in the unloading of granular material such as grain or the like from a storage bin or similar structure by means of an unloading device separate from the bin and having an open auger conveyor wherein the bin has a horizontal floor on which the material is supported and a vertical wall behind which the material is confined and in which is provided an opening that extends upwardly from the level of the floor and through which access is had to the material by insertion of the auger horizontally over the floor: a unit attachment shield of imperforate sheet metal or the like of elongated construction having its cross-sectional shape in the form of an inverted U to provide a top wall and a pair of spaced apart generally vertical side walls and an inner end and an outer end, said shield being positionable within the bin with the outer end adjoining and in alignment with the opening in said bin wall and extending inwardly over the floor so that the inner end is relatively remote from said opening and with the top wall of said shield spaced above the bin floor and the side walls extending to the floor to cooperate with the floor and provide a tunnel entirely above the level of the floor and communicating at the outer end of the shield through said bin wall opening to receive the auger and opening at the inner end of the shield to material in the bin, the length of the shield from its inner end to its outer end being such that the angle of repose of material in the bin that has gravitational access to the inner end of the shield intersects the bin floor within the tunnel sufficiently remote from the bin wall opening so that material cannot flow by gravity outwardly through said opening, and each of said side walls having means thereon for attaching the shield to the bin floor.

3. For use in the unloading of granular material such as grain or the like from a storage bin or similar structure by means of a portable elevator having an open auger conveyor wherein the bin has a horizontal floor on which the material is supported and a vertical wall behind which the material is confined and in which is provided an opening that extends upwardly from the level of the floor and through which access is had to the material by insertion of the auger horizontally over the floor: a unit attachment shield of sheet metal or the like of elongated construction having its cross-sectional shape in the form of an inverted U to provide an arcuate top wall and a pair of spaced apart generally vertical side walls and an inner end and an outer end, said shield being positionable within the bin with the outer end adjoining and in alignment with the opening in said bin wall and extending inwardly over the floor so that the inner end is relatively remote from said opening and with the top wall of said shield spaced above the bin floor and the side walls extending to the floor to cooperate with the floor and provide a tunnel entirely above the level of the floor and communicating at the outer end of the shield through said bin wall opening to receive the elevator auger and opening at the inner end of the shield to material in the bin, the length of the shield from its inner end to its outer end being such that the angle of repose of material in the bin that has gravitational access to the inner end of the shield intersects the bin floor within the tunnel sufficiently remote from the bin wall opening so that material cannot flow by gravity outwardly through said opening, each of said side walls having horizontally flanged portions provided with perforations to receive securing means for attaching the shield to the bin floor, and said shield having at its outer end portion a peripheral flange transversely thereof for attachment to the bin wall structure.

LEONARD B. NEIGHBOUR.

REFERENCES CITED

The following references are of record in the file of this patent:

UNITED STATES PATENTS

| Number | Name | Date |
| --- | --- | --- |
| 879,366 | Conway | Feb. 18, 1908 |
| 2,121,328 | Roesch | June 21, 1938 |
| 2,418,540 | Bressler | Apr. 8, 1947 |